(12) United States Patent
Tsai

(10) Patent No.: US 9,950,563 B2
(45) Date of Patent: Apr. 24, 2018

(54) WHEEL CONNECTING DEVICE

(71) Applicant: Po-Chuan Tsai, Tainan (TW)

(72) Inventor: Po-Chuan Tsai, Tainan (TW)

( * ) Notice: Subject to any disclaimer, the term of this patent is extended or adjusted under 35 U.S.C. 154(b) by 0 days.

(21) Appl. No.: 15/658,711

(22) Filed: Jul. 25, 2017

(65) Prior Publication Data

US 2018/0065412 A1    Mar. 8, 2018

(30) Foreign Application Priority Data

Jul. 27, 2016 (TW) .............................. 105211358 U

(51) Int. Cl.
*B60B 33/00* (2006.01)

(52) U.S. Cl.
CPC ...... *B60B 33/0002* (2013.01); *B60B 33/0068* (2013.01)

(58) Field of Classification Search
CPC ... Y10T 16/199; Y10T 16/201; Y10T 16/202; Y10T 16/211; B60B 33/0005; B60B 33/0015; B60B 33/0021; B60B 33/0045; B60B 33/001; B60B 33/0002; B60B 33/0068
See application file for complete search history.

(56) References Cited

U.S. PATENT DOCUMENTS

| | | | | | |
|---|---|---|---|---|---|
| 1,721,301 A | * | 7/1929 | Herold | .................. | B60B 33/045 16/38 |
| 1,929,743 A | * | 10/1933 | Jarvis | .................. | B60B 33/0002 16/38 |
| 2,659,100 A | * | 11/1953 | Cramer | ............... | B60B 33/0002 16/18 CG |
| 3,128,495 A | * | 4/1964 | Tooth | .................. | B60B 33/0002 16/38 |
| 3,210,795 A | * | 10/1965 | Fontana | .............. | B60B 33/0002 16/273 |
| 3,768,116 A | * | 10/1973 | Propst | ................. | B60B 33/0002 16/43 |
| 4,361,930 A | * | 12/1982 | Seesengood | ........ | B60B 33/0002 16/38 |
| 4,793,021 A | * | 12/1988 | Deasy | ................. | B60B 33/0002 16/273 |
| 5,062,178 A | * | 11/1991 | Chiu | ................... | B60B 33/0002 16/30 |
| 2005/0086765 A1 | * | 4/2005 | Melara | ................ | B60B 33/0002 16/22 |
| 2010/0088847 A1 | * | 4/2010 | Hicks | .................. | B60B 33/0021 16/46 |
| 2013/0111700 A1 | * | 5/2013 | Waitz | ....................... | A45C 5/14 16/44 |
| 2013/0326844 A1 | * | 12/2013 | Stoehr | ................... | B60B 27/001 16/46 |

* cited by examiner

*Primary Examiner* — Chuck Mah
(74) *Attorney, Agent, or Firm* — Burris Law, PLLC

(57) ABSTRACT

A wheel connecting device includes a mounting seat, a shaft, a sleeve member and a retaining member. The mounting seat defines an accommodating space and includes a surrounding wall that has an inner surrounding surface surrounding the accommodating space. The shaft has a first mounting segment that is inserted into the accommodating space, and a second mounting segment that is disposed under and connected to the first mounting segment. The sleeve member is sleeved on the connecting portion of the first mounting segment of the shaft. The retaining member extends helically around a neck portion of the first mounting segment of the shaft, and is in contact with the neck portion and the surrounding wall.

3 Claims, 3 Drawing Sheets

WHEEL CONNECTING DEVICE

CROSS-REFERENCE TO RELATED APPLICATION

This application claims priority of Taiwanese Patent Application No. 105211358, filed on Jul. 27, 2016.

FIELD

This disclosure relates to a wheel connecting device, and more particularly to a wheel connecting device that configures a wheel onto objects such as, but not limited to, suitcases and furniture.

BACKGROUND

Referring to FIG. 1, a conventional wheel connecting device can be installed at a bottom of a chair (not shown), and is suitable for mounting of a wheel 10 thereon. The conventional wheel connecting device includes a mounting seat 11, a shaft 12, and two retaining members 13. The mounting seat 11 includes an accommodating space 110 that is defined by a top wall 111 and a surrounding wall 112. The surrounding wall 112 extends downward from a periphery of the top wall 111, and has an inner surrounding surface 113 that surrounds the accommodating space 110. The shaft 12 has an upper segment 121 that is inserted into the accommodating space 110, and a lower segment 122 that is disposed under and connected to the upper segment 121, and that is adapted for mounting of the wheel 10. The upper segment 121 has an outer surface 123 formed with two spaced-apart surrounding grooves 124. Each of the retaining members 13 is disposed in a respective one of the surrounding grooves 124, and circles around the upper segment 121 of the shaft 12 in order to allow the shaft 12 to rotationally interact with the mounting seat 11.

However, there exists a considerable gap between the upper segment 121 and the inner surrounding surface 113, and given that the rotation of the shaft 12 can cause unintentional shaking, there is a tendency for the shaft 12 to collide with the surrounding wall 112 and make noises. Additionally, the mounting seat 11 also has to withstand the weight from the chair (and its user) as well as lateral forces from turning and moving, which renders the mounting seat 11 more likely to collide with the shaft 12.

SUMMARY

Therefore, an object of disclosure is to provide a wheel connecting device that can alleviate at least one of the drawbacks of the prior art.

According to an aspect of the disclosure, the wheel connecting device is adapted to be connected to a wheel to constitute a caster. The wheel connecting device includes a mounting seat, a shaft, a sleeve member and a retaining member.

The mounting seat defines an accommodating space, and includes a surrounding wall that has an inner surrounding surface surrounding the accommodating space.

The shaft has a first mounting segment that is inserted into the accommodating space, and a second mounting segment that is disposed under and connected to the first mounting segment, and that is adapted for mounting of the wheel thereon. The first mounting segment has a connecting portion, a first enlarged portion that extends from a bottom end of the connecting portion, a second enlarged portion that is disposed under the first enlarged portion, and a neck portion that is connected between the first and second enlarged portions. Each of the first and second enlarged portions has an outer lateral surface that is spaced apart from the inner surrounding surface of the surrounding wall of the mounting seat. The neck portion has a diameter smaller than that of the first enlarged portion and that of the second enlarged portion, and cooperates with the first and second enlarged portions to define a surrounding groove thereamong.

The sleeve member is sleeved on the connecting portion of the first mounting segment of the shaft, and has an internal surface that is in contact with the connecting portion, and an external surface that is opposite to the internal surface and that is in contact with the inner surrounding surface of the surrounding wall of the mounting seat.

The retaining member is disposed in the surrounding groove, extends helically around the neck portion of the first mounting segment of the shaft, and is co-rotatable with the shaft. The retaining member has a first end portion that abuts against a bottom end of the first enlarged portion of the first mounting segment of the shaft, a second end portion that abuts against a top end of the second enlarged portion of the first mounting segment of the shaft, and a linking portion that interconnects the first and second end portions. The retaining member further has an inner peripheral surface and an outer peripheral surface. The inner peripheral surface extends through the first end portion, the linking portion and the second end portion, and is in contact with the neck portion of the first mounting segment of the shaft. The outer peripheral surface extends through the first end portion, the linking portion and the second end portion, is opposite to the inner peripheral surface, and is in contact with the inner surrounding surface of the inner surrounding wall of the mounting seat.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
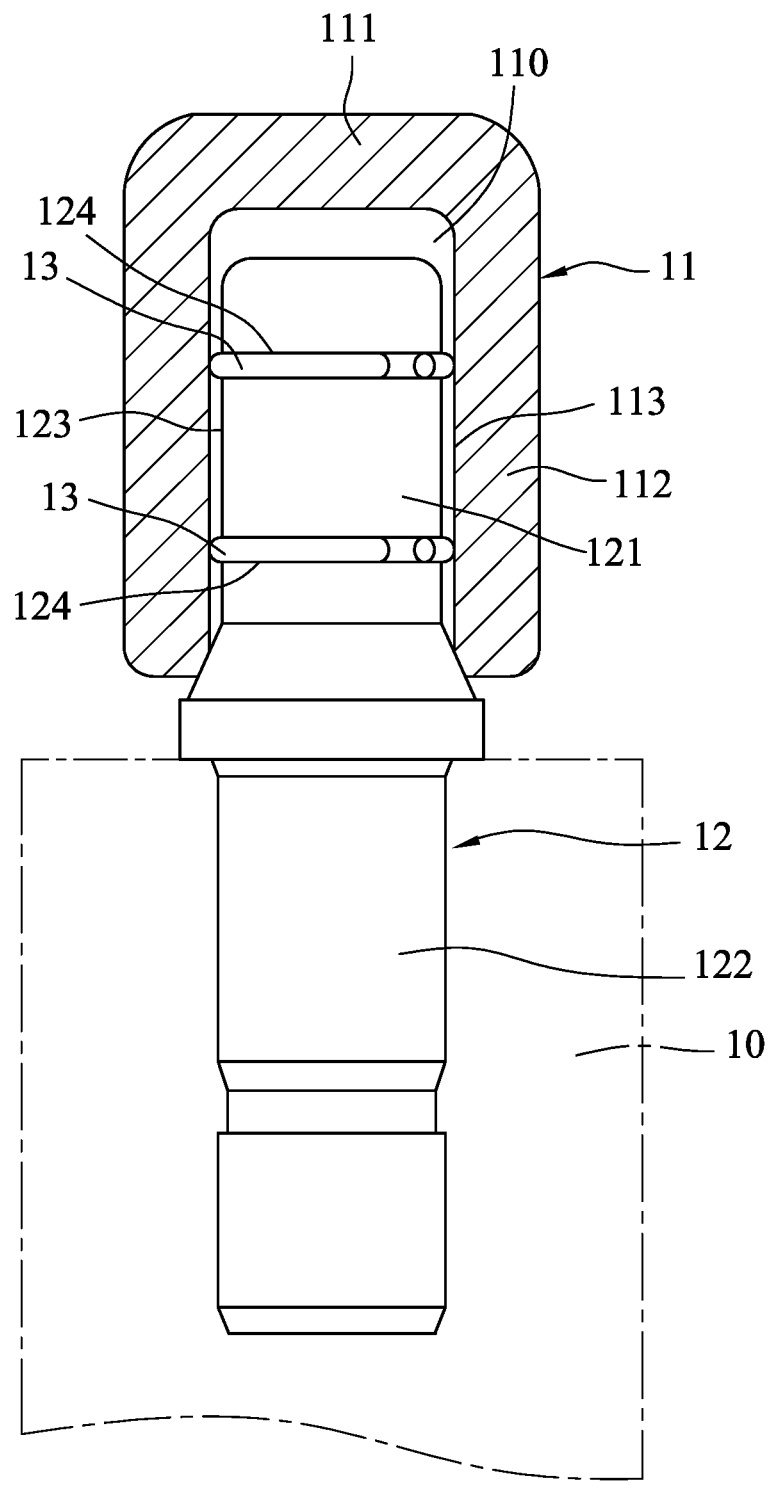
FIG. 1 is a partly sectional view of a conventional wheel connecting device.
Figure 2:
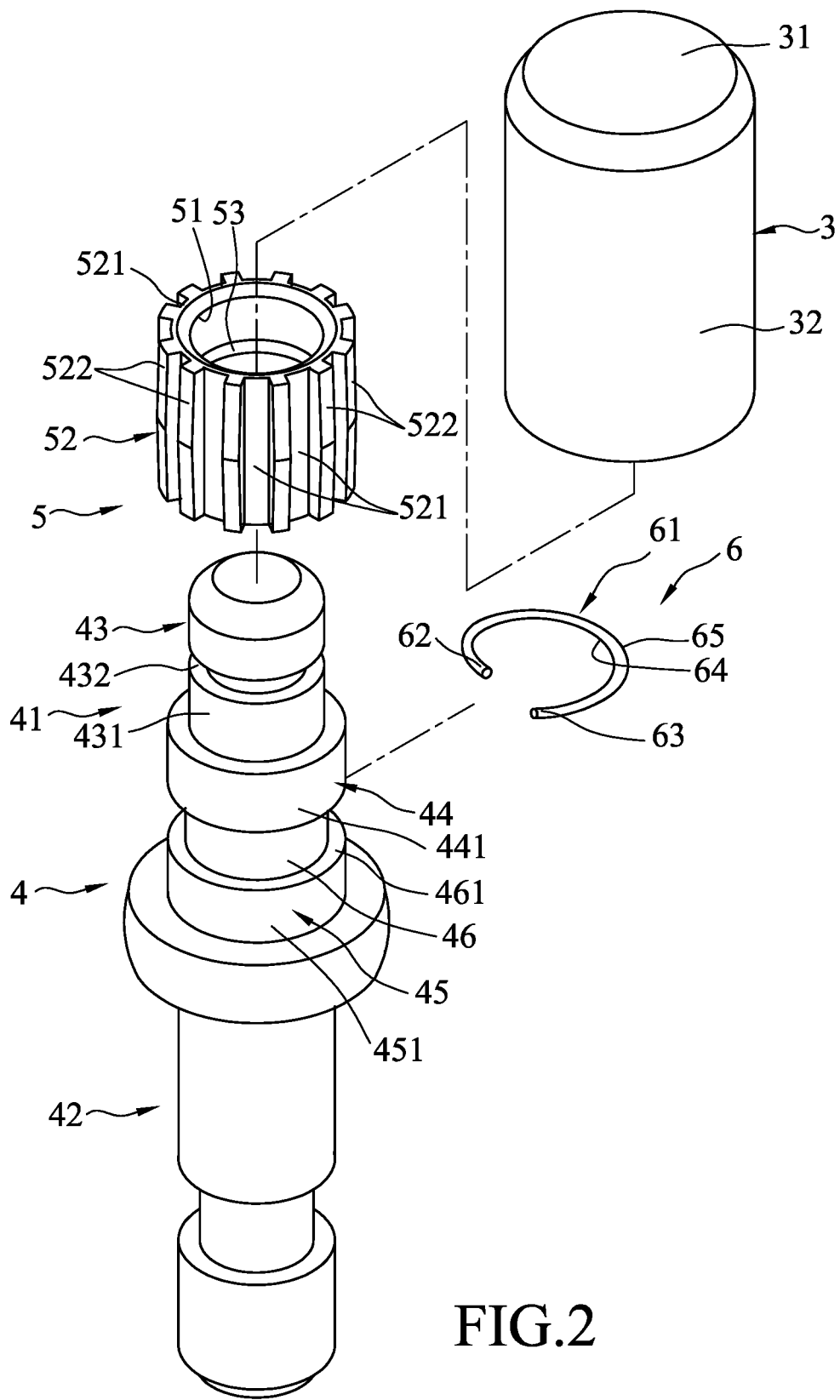
FIG. 2 is an exploded perspective view illustrating an embodiment of a wheel connecting device according to the disclosure.
Figure 3:
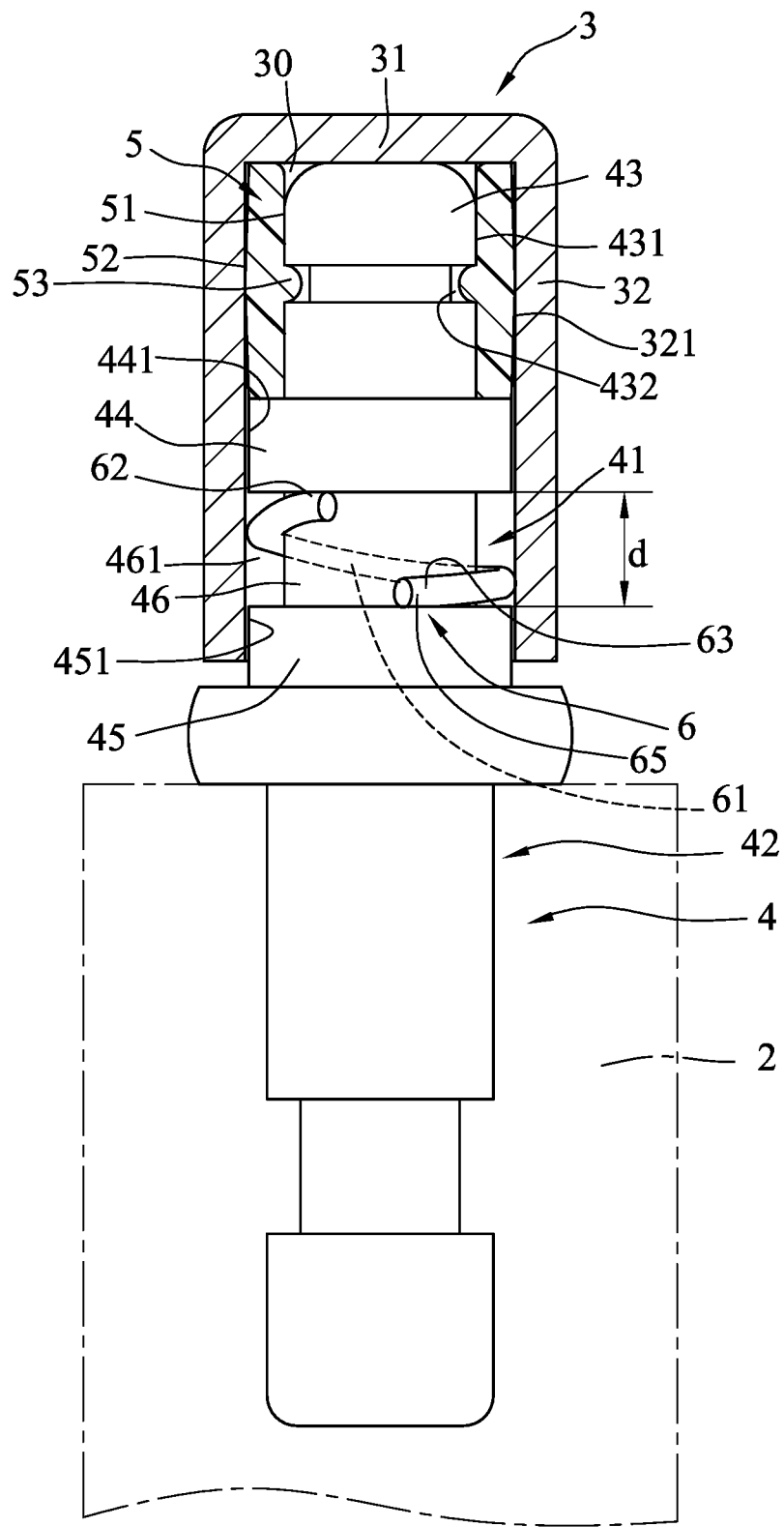
FIG. 3 is a partly sectional view illustrating the embodiment of the wheel connecting device.

Referring to FIGS. 2 and 3, an embodiment of a wheel connecting device is adapted to be connected to a wheel 2 to constitute a caster, and is used for installation at a bottom of a chair (not shown). During its implementation, the wheel connecting device can be used to connect the wheel 2 onto objects such as furniture, medical equipment, shopping cart, and suitcase, etc. In this embodiment, the wheel connecting device includes a mounting seat 3, a shaft 4, a sleeve member 5 and a retaining member 6.

The mounting seat 3 is adapted to be installed at the bottom of the chair, and defines an accommodating space 30. The mounting seat 3 includes an evenly leveled top wall 31 and a surrounding wall 32 that extends downward from a periphery of the top wall 31. The surrounding wall 32 has an inner surrounding surface 321 that surrounds the accommodating space 30.

The shaft 4 has a first mounting segment 41 inserted into the accommodating space 30, and a second mounting segment 42 disposed under and connected to the first mounting segment 41, and adapted for mounting of the wheel 2 thereon. The first mounting segment 41 has a connecting portion 43, a first enlarged portion 44 extending from a bottom end of the connecting portion 43, a second enlarged portion 45 disposed under the first enlarged portion, and a neck portion 46 connected between the first and second enlarged portions 44, 45. Diameter of the cross-section of the connecting portion 43 is not uniform from top to bottom. The connecting portion 43 has an outer surface 431 formed with a ring-shaped recess 432.

The first enlarged portion 44 has a first outer lateral surface 441, and the second enlarged portion 45 has a second outer lateral surface 451. Each of the first and second outer lateral surfaces 441, 451 faces and is spaced apart from the inner surrounding surface 321 of the surrounding wall 32 of the mounting seat 3. In other words, the first and second enlarged portions 44, 45 do not have physical contact with the inner surrounding surface 321, creating a tiny gap between the first and second enlarged portions 44, 45 and the inner surrounding surface 321. The neck portion 46 has a diameter smaller than that of either of the first and second enlarged portions 44, 45, and cooperates with the first and second enlarged portions 44, 45 to define a surrounding groove 461 thereamong.

In this embodiment, the sleeve member 5 is made of plastic. The sleeve member 5 is fixed inside the accommodating space 30 of the mounting seat 3 and is sleeved on the connecting portion 43 of the first mounting segment 41 of the shaft 4. The sleeve member 5 has an internal surface 51 being in contact with the outer surface 431 of the connecting portion 43, an external surface 52 opposite to the internal surface 51 and being in contact with the inner surrounding surface 321 of the surrounding wall 32 of the mounting seat 3, and a flange 53 projecting from the internal surface 51 and engaging the recess 432. The external surface 52 has a plurality of angularly spaced-apart base surface portions 521, and a plurality of angularly space-apart projecting surface portions 522 projecting outwardly, arranged alternately with the base surface portions 521, and being in contact with the inner surrounding surface 321 of the surrounding wall 32 of the mounting seat 3. The external surface 52 bears bump structures that can improve the structural strength, toughness and deformability of the sleeve member 5, thereby allowing the projecting surface portions 522 to firmly remain in contact with the inner surrounding surface 321.

The retaining member 6 is made of metal, is disposed in the surrounding groove 461, extends helically around the neck portion 46 of the first mounting segment 41 of the shaft 4, and is co-rotatable with the shaft 4. The retaining member 6 has a first end portion 62 that abuts against a bottom end of the first enlarged portion 44 of the first mounting segment 41 of the shaft 4, a second end portion 63 that abuts against a top end of the second enlarged portion 45 of the first mounting segment 41 of the shaft 4, and a linking portion 61 interconnecting said first and second end portions 62, 63. The first end portion 62 is positioned higher than the second end portion 63. The retaining member 6 further has an inner peripheral surface 64 and an outer peripheral surface 65 that is opposite to the inner peripheral surface 64. Both of the inner and outer peripheral surfaces 64, 65 extend through the first end portion 62, the linking portion 61 and the second end portion 63. The inner peripheral surface 64 is in contact with the neck portion 46 of the first mounting segment 41 of the shaft 4, and the outer peripheral surface 65 is in contact with the inner surrounding surface 321 of the inner surrounding wall 32 of the mounting seat 3.

When utilizing this embodiment of the wheel connecting device, during its activity, the wheel 2 can move freely rotationally, as the shaft 4 bears the design to rotate around its own vertical axis. The retaining member 6 also rotates, but the sleeve member 5 and the mounting seat 3 do not. The sleeve member 5 is affixed between the surrounding wall 32 of the mounting seat 3 and the shaft 4, and fills the space in between the two, thereby allowing the shaft 4 to stably rotate and reducing shock and collision noise during its rotation. The retaining member 6 also reduces the shock and collision noise, but its main purpose is to hold the mounting seat 3 and the shaft 4 together. The inner peripheral surface 64 and the outer peripheral surface 65 of the retaining member 6 are respectively affixed to the neck portion 46 of the shaft 4 and the surrounding wall 32 of the mounting seat 3 in a way that allows the retaining member 6 to buckle tightly between the shaft 4 and the surrounding wall 32 so the shaft 4 does not fall off.

It should be noted that there is an elevation difference between the first end portion 62 and the second end portion 63 of the retaining member 6, allowing the linking portion 61 and the first and second end portions 62, 63 to thoroughly encompass the vertical length of the surrounding groove 461 (which is substantially equal to a distance (d) between the bottom end of the first enlarged portion 44 and the top end of the second enlarged portion 45 as illustrated in FIG. 3). In comparison to the planar retaining member 13 of the abovementioned conventional wheel connecting device, the outer peripheral surface 65 of the retaining member 6 in this embodiment has more vertical contact surface area with the surrounding wall 32 of the mounting seat 3, thereby improving the grip between the mounting seat 3 and the shaft 4. On the other hand, there are intended gaps between each of the first and second enlarged portions 44, 45 and the surrounding wall 32 of the mounting seat 3 in order to allow the shaft 4 to rotate properly, as the shaft 4 should not have perfect fit with the surrounding wall 32.

As explained above, the placement of the sleeve member 5 and the retaining member 6 between the mounting seat 3 and the shaft 4 stabilizes the rotation of the shaft 4 within the mounting seat 3 and reduces collisions between the two, thereby extending the service life of the wheel connecting device.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A wheel connecting device adapted to be connected to a wheel to constitute a caster, said wheel connecting device comprising:
   amounting seat defining an accommodating space, and including a surrounding wall that has an inner surrounding surface surrounding said accommodating space;
   a shaft having
      a first mounting segment that is inserted into said accommodating space, and that has
         a connecting portion,
         a first enlarged portion extending from a bottom end of said connecting portion, and having an outer lateral surface that is spaced apart from said inner surrounding surface of said surrounding wall of said mounting seat,
         a second enlarged portion disposed under said first enlarged portion, and having an outer lateral surface that is spaced apart from said inner surrounding surface of said surrounding wall of said mounting seat, and
         a neck portion connected between said first and second enlarged portions, having a diameter smaller than that of said first enlarged portion and that of said second enlarged portion, and cooperating with said first and second enlarged portions to define a surrounding groove thereamong, and
      a second mounting segment that is disposed under and connected to said first mounting segment, and that is adapted for mounting of the wheel thereon;
   a sleeve member sleeved on said connecting portion of said first mounting segment of said shaft, and having an internal surface that is in contact with said connecting portion, and an external surface that is opposite to said internal surface and that is in contact with said inner surrounding surface of said surrounding wall of said mounting seat; and
   a retaining member disposed in said surrounding groove, extending helically around said neck portion of said first mounting segment of said shaft, co-rotatable with said shaft, and having a first end portion that abuts against a bottom end of said first enlarged portion of said first mounting segment of said shaft, a second end portion that abuts against a top end of said second enlarged portion of said first mounting segment of said shaft, and a linking portion that interconnects said first and second end portions, said retaining member further having an inner peripheral surface that extends through said first end portion, said linking portion and said second end portion, and that is in contact with said neck portion of said first mounting segment of said shaft, and an outer peripheral surface that extends through said first end portion, said linking portion and said second end portion, that is opposite to said inner peripheral surface, and that is in contact with said inner surrounding surface of said inner surrounding wall of said mounting seat.

2. The wheel connecting device as claimed in claim 1, wherein said external surface of said sleeve member has a plurality of angularly spaced-apart base surface portions, and a plurality of angularly spaced-apart projecting surface portions projecting outwardly, arranged alternately with said base surface portions, and being in contact with said inner surrounding surface of said surrounding wall of said mounting seat.

3. The wheel connecting device as claimed in claim 1, wherein:
   said connecting portion of said first mounting segment of said shaft has an outer surface formed with a recess;
   said sleeve member further has a flange that projects from said internal surface and that engages said recess.

* * * * *